United States Patent Office 2,852,510
Patented Sept. 16, 1958

2,852,510
HETEROCYCLIC COMPOUNDS AND PROCESS FOR PRODUCING SAME

Karl Hoffmann and Ernst Urech, Binningen, Switzerland, assignors to Ciba Pharmaceutical Products Inc., Summit, N. J.

No Drawing. Application May 22, 1957
Serial No. 660,742

Claims priority, application Switzerland March 3, 1954

6 Claims. (Cl. 260—239.3)

This is a continuation-in-part of our copending application, Serial No. 489,305, filed February 18, 1955, now abandoned.

This invention relates to 10-(tertiary-aminoalkyl)-11-oxo-dibenzo[b:f]-thia-[1]-aza-[4] - cycloheptadiene - [2:6]-compounds having the general formula:

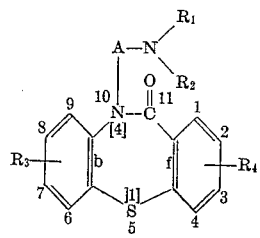

and salts, such as acid addition salts or quaternary ammonium salts thereof. A in the above general formula represents a lower alkylene radical and $R_1$ and $R_2$ represent, interchangeably, lower alkyl or cycloalkyl radicals, and when taken together, lower alkylene or lower monooxyaalkylene radicals, preferably those containing 4 to 5 carbon atoms. The positions 1 to 4 and 6 to 9 may be unsubstituted or substituted, that is to say, $R_3$ and $R_4$ may represent, interchangeably, hydrogen, halogen, i. e. chloro, bromo, fluoro or iodo; amino; lower alkyl or lower alkoxy groups.

The tertiary aminoalkyl radical, of which the alkylene chain may be straight or branched, is preferably a tertiary amino-lower alkyl radical. The tertiary amino group is more especially an amino group disubstituted by alkyl and/or cycloalkyl radicals or an amino group disubstituted by an alkylene radical which may, if desired, be interrupted by a hereto atom such as oxygen. Such aminoalkyl radicals are, for example, dimethylamino-, diethylamino-, pyrrolidino-, piperidino-, or morpholino-ethyl, -propyl, -isopropyl, -butyl, -isobutyl or -pentyl groups.

As quaternary ammonium salts there may be mentioned, more especially, lower alkyl ammonium salts, for example, lower alkyl ammonium halides, e. g., methyl, ethyl, propyl and butyl ammonium chlorides.

These new basically substituted heterocyclic compounds which comprise the invention possess an antihistaminic effect and are useful as antihistamines. They can be administered in any suitable manner, for example orally, in combination with an adjuvant as a carrier to facilitate the administration thereof.

The new compounds are obtained by introducing into an 11-oxo-dibenzo-[b:f]-thia-[1]-aza-[4]-cycloheptadiene-[2:6]-compound, which is unsubstituted in the 10-position, a tertiary aminoalkyl radical into the 10-position, and, if desired, converting the base so obtained into an acid addition salt or a quaternary ammonium salt thereof. The introduction of this radical can be carried out for example, by reacting the compound unsubstituted in 10-position, for example in the form of a metal salt thereof or in the presence of a condensing agent, especially one which is capable of forming a metal salt therewith, such as an alkali metal or alkaline earth metal, for example, sodium, lithium, calcium or an amide, hydride, hydrocarbon compound or alcoholate thereof, for example, sodamide, sodium hydride, lithium butyl, potassium phenyl, lithium phenyl, potassium tertiary butylate or potassium tertiary amylate, with a reactive ester of a tertiary aminoalkanol. Reactive esters, are especially those of strong inorganic or organic acids, such as hydrohalic acids, e. g. hydrochloric acid or organic sulfonic acids, such as paratoluene sulfonic acid.

The preparation of quaternary ammonium salts of a free tertiary amine so obtained is carried out, for example, by reaction with an alkyl halide, dialkyl sulfate or sulfonic acid alkyl ester.

Depending on the conditions used the new compounds are obtained in the form of their bases, acid addition salts, or quaternary ammonium salts. From the salts there can be obtained in known manner the free amines or ammonium bases. From the free amines and ammonium bases, salts can be obtained by reaction with acids which are suitable for the formation of therapeutically useful or non-toxic salts, for example, hydrohalic acids, sulfuric acid, nitric acid, phosphoric acid, thiocyanic acid, acetic acid, propionic acid, oxalic acid, malonic acid, succinic acid, malic acid, methane sulfonic acid, ethane sulfonic acid, hydroxyethane sulfonic acid, benzene or toluene sulfonic acid or therapeutically active acids.

The starting materials, namely 11-oxo-dibenzo-[b:f]-thia-[1]-aza-[4]-cycloheptadiene-[2:6] - compounds which are unsubstituted in the 10-position are new. In general they are prepared by intramolecularly condensing by heating in the absence of an acid condensing agent N-unsubstituted 2-amino-diphenylsulfide-2′-carboxylic acids or their functional derivatives, e. g. esters with lower alkanols. The novel intermediates and process for their manufacture are described below.

The new compounds are useful as medicaments, for example, in the form of pharmaceutical preparations, which contain the new compound or a salt thereof in admixture with a pharmaceutical organic or inorganic solid or liquid carrier suitable for enteral, parenteral or topical administration. For making up the preparation there can be employed substances which do not react with the new compounds such, for example, as water, gelatine, lactose, starches, magnesium stearate, talc, vegetable oils, benzyl alcohols, gums, polyalkylene glycols, petroleum jelly, cholesterol or another known carrier for medicaments. The pharmaceutical preparations may be, for example, in the form of tablets, dragees, salves, creams or in liquid form as solutions, suspensions or emulsions. If desired, they may be sterilized and/or contain auxiliary substances, such as preserving agents, stabilizing agents, wetting or emulsifying agents, salts for varying the osmotic pressure or buffers. They may also contain other therapeutically useful substances. The preparations are obtained by the usual methods employed in formulating pharmaceutical dosage forms.

The following examples illustrate the invention, the parts being by weight unless otherwise stated and the relationship of parts by weight to parts by volume being the same as that of the gram to the cubic centimeter:

EXAMPLE 1

22.7 parts of 11-oxo-dibenzo-[b:f]-thia-[1]-aza-[4]-cycloheptadiene-[2:6] and 5 parts of sodamide are heated in 400 parts by volume of xylene at the boil until the evolution of ammonia ceases. A solution of 20 parts of β-diethylamino-ethyl chloride in xylene is run in in the course of 2 hours, and the whole is heated for a further 2 hours at 120–135° C. After being cooled to about 80° C., the reaction mass is then filtered with suction and the xylene is distilled off in vacuo. The residue is dissolved in dilute hydrochloric acid, the solution is extracted with ether, and the aqueous solution is mixed with alkali. The base which separates is dissolved in ether, the ethereal solution is dried over potassium carbonate and evaporated. By distillation there is obtained in good yield a fraction boiling at 165–170° C. under 0.18 mm. pressure in the form of a pale yellow oil. It is 10-(β-diethylamino-ethyl)-11-oxo-dibenzo-[b:f]-thia-[1]-aza-[4]-cycloheptadiene-[2:6] of the formula

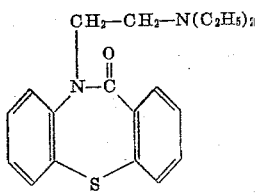

A solution of the base in ethyl acetate yields on the addition of the calculated quantity of alcoholic hydrochloric acid the colorless hydrochloride melting at 168–170° C. It is easily soluble in water. In a similar manner there can be obtained other salts such as the hydrobromide, phosphate, sulfate, oxalate and the like.

EXAMPLE 2

22.7 parts of 11-oxo-dibenzo-[b:f]-thia-[1]-aza-[4]-cycloheptadiene-[2:6] and 5 parts of sodamide are heated with 250 parts by volume of dioxane for 90 minutes at the boil, during which ammonia is evolved. A solution of 13 parts of β-dimethylamino-ethyl chloride in dioxane is then added in the course of one hour at the boil, and the mixture is boiled for a further 2 hours. After the reaction, the excess of sodamide is decomposed by the addition of a small amount of alcohol. The reaction mass is then filtered with suction, the filtrate evaporated to dryness and the residue is recrystallized from ethyl acetate. In this manner there is obtained 10-(β-dimethylamino-ethyl)-11-oxo-dibenzo-[b:f]-thia-[1]-aza - [4] - cycloheptadiene-[2:6] of the formula

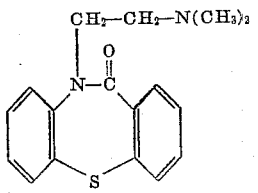

in the form of colorless crystals melting at 139–140° C. The colorless hydrochloride obtained in the manner described in Example 1 melts at 232–235° C. and is easily soluble in water.

In the above reaction the dioxane may be replaced by another inert solvent such as benzene, toluene or xylene.

EXAMPLE 3

22.7 parts of 11-oxo-dibenzo-[b:f]-thia-[1]-aza-[4]-cycloheptadiene-[2:6] and 5 parts of sodamide are heated with 250 parts by volume of dioxane for 90 minutes at the boil. There is then added in the course of one hour a solution of 18.7 parts of γ-diethylamino-propyl chloride in dioxane at the boiling temperature and boiled for a further 2 hours. The excess of sodamide is then decomposed with a small amount of alcohol, the reaction mixture is filtered with suction and the filtrate is evaporated to dryness. The residue is dissolved in dilute hydrochloric acid, a small amount of neutral substances is extracted from this solution with ether, and the base so obtained is precipitated from the acid solution by means of alkali. This base is taken up in ether and the ether is distilled off, after drying the solution over potassium carbonate. The residual oil is distilled in a high vacuum, whereby 10-(γ-diethylamino-propyl)-11-oxo-dibenzo-[b:f]-thia-[1]-aza-[4]-cycloheptadiene-[2:6] of the formula

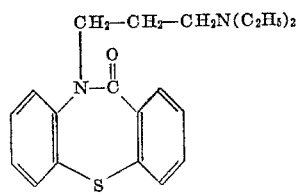

passes over in the form of a yellowish thick oil boiling at 182–188° C. under a pressure of 0.18 mm.

The hydrochloride obtained in ethyl acetate with the aid of alcoholic hydrochloric acid is a colorless crystalline powder melting at 148–150° C., which is easily soluble in water.

EXAMPLE 4

In the procedure described in Example 2 there is used, instead of β-dimethylamino-ethyl chloride, 18.2 parts of γ-pyrrolidino-propyl chloride. After working up the dioxane solution as described in Example 2, there is obtained a crude base which is recrystallized from three times the quantity of isopropyl ether to yield pure 10-(γ-pyrrolidino-propyl) - 11 - oxo - dibenzo - [b:f] - thia - [1] - aza - [4]-cycloheptadiene-[2:6] of the formula

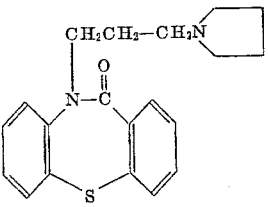

in the form of colorless crystals melting at 76–78° C.

The hydrochloride prepared in the same manner as described in Example 1, is recrystallized from a mixture of ethyl acetate and alcohol and melts at 197–198° C. It is easily soluble in water.

By starting from γ-piperidino-propyl chloride there can be obtained in a similar manner 10-(γ-piperidino-propyl)-11 - oxo - dibenzo - [b:f] - thia - [1] - aza - [4] - cycloheptadiene-[2:6] of the formula

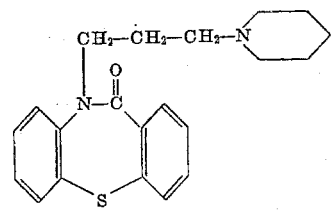

EXAMPLE 5

56.7 parts of 11-oxo-dibenzo-[b:f]-thia-[1]-aza-[4]-cycloheptadiene-[2:6] are heated at the boil with 12.5 parts of sodamide in 550 parts of dioxane until the evolution of ammonia ceases. A dioxane solution of 38.0 parts of β-dimethylamino-α-methyl-ethyl chloride is introduced dropwise in the course of 90 minutes, and then the whole is heated at the boil for a further 2 hours. When the reaction has ceased, a small amount of methanol is added and the warm reaction mass is filtered with suction. The filtrate is evaporated to dryness and the evaporation residue is crystallized from 3 parts by volume of hexane, whereby 63 parts of a crystallizate melting at 106–110° C. are obtained. Further recrystallization of this fraction raised the melting point to 110–112° C. It is 10 - (β-dimethylamino-β-methyl-ethyl)-11-oxo-di - benzo - [b:f] - thia - [1] - aza - [4] - cycloheptadiene-[2:6] of the Formula I. A further fraction having a lower melting point is 10-(β-dimethylamino-α- methyl - ethyl) - 11 - oxo - dibenzo - [b:f] - thia - [1]- aza-[4]-cycloheptadiene-[2:6] of the Formula II.

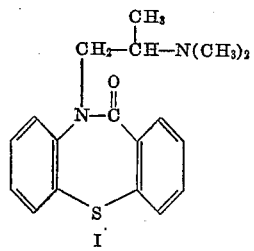
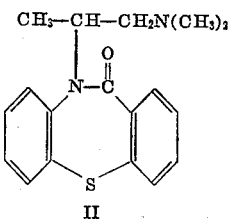

I  II

The hydrochloride of the Base I prepared in the same manner as described in Example I, when recrystallized from iso-propanol melts at 150–152° C. It is easily soluble in water.

EXAMPLE 6

39.3 parts of 8-chloro-11-oxo-dibenzo-[b:f]-thia-[1]-aza-[4]-cycloheptadiene-[2:6], 7.5 parts of sodamide and 375 parts by volume of dioxane are heated at the boil until the evolution of ammonia ceases. 20.2 parts of β-dimethyl-amino-ethyl chloride are then run in in the course of one hour, and the whole is heated for a further 2 hours under reflux. After the addition of a small amount of methanol, the mixture is filtered with suction and the filtrate is evaporated to dryness. The dry residue is dissolved in 4 parts by volume of iso-propyl-ether. Upon cooling, 8 - chloro - 10-(β-dimethyl-amino-ethyl) - 11 - oxo - dibenzo - [b:f] - thia - [1] - aza - [4]-cycloheptadiene-[2:6] of the formula

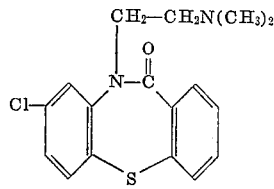

separates out in good yield in the form of colorless crystals melting at 92–94° C.

The hydrochloride, which is prepared from the base in a mixture of ethyl acetate and alcohol with hydrochloric acid, melts at 236–238° C., and is easily soluble in water.

EXAMPLE 7

8 - chloro - 10 - (γ - dimethylamino - propyl) - 11-oxo - dibenzo - [b:f] - thia - [1] - aza - [4] - cycloheptadiene-[2:6] of the formula

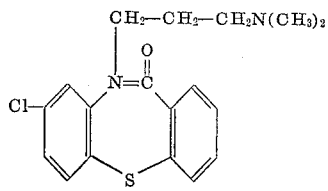

is obtained in the form of colorless crystals melting at 111–113° C. by the procedure described in Example 6, by using, instead of β-dimethylamino-ethyl chloride 30.0 parts of γ-dimethylamino-propyl chloride.

The hydrochloride is prepared from the base by neutralizing a solution in ethyl acetate with the calculated quantity of alcoholic hydrochloric acid. It melts at 172–174° C. and dissolves well in water.

EXAMPLE 8

8 - chloro - 10 (γ - diethylamino - propyl) - 11 - oxo - dibenzo - [b:f] - thia - [1] - aza - [4] - cycloheptadiene-[2:6]- melting at 51–53° C. is prepared as described in Example 6 by using, instead of β-dimethylamino-ethyl chloride, 28.0 parts of γ-diethylamino-propyl chloride.

The base can be recrystallized from hexane. It has the following formula

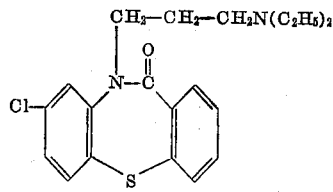

The hydochloride is obtained by neutralizing a solution of the base in isopropanol with the calculated quantity of alcoholic hydrochloric acid. It melts at 186–188° C.

EXAMPLE 9

If instead of the 8-chloro-11-oxo-compound described in Example 6 there are used 39.3 parts of 7-chloro-11-oxo - [b:f] - thia - [1] - aza - [4] - cycloheptadiene-[2:6] there is obtained 7-chloro-10-(β-dimethylaminoethyl) - 11 - oxo - dibenzo - [b:f] - thia - [1] - aza - [4]-cyclo-heptadiene-[2:6]- of the formula

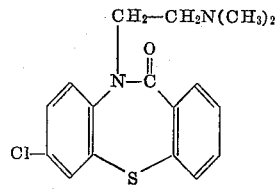

as colorless crystals melting at 87–89° C. from iso-propyl ether. The hydrochloride prepared in ethanol has a melting point of 259–261° C. with decomposition.

EXAMPLE 10

39.3 parts of 7-chloro-11-oxo-dibenzo-[b:f]-thia-[1]-azo-[4]-cycloheptadiene-[2:6], 7.5 parts of sodamide and 26.4 parts of diethylamino-ethyl chloride in dioxane are reacted in the manner described in Example 6. There is obtained 7-chloro-10-(β-diethylamino-ethyl)-11-oxo-dibenzo-[b:f]-thia-[1]-aza-[4] - cycloheptadiene - [2:6] of the formula

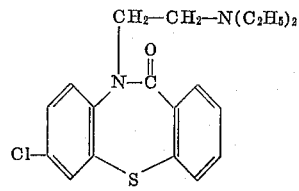

as a thick oil boiling at 190–193° C. under 0.17 mm. pressure of mercury. With dilute hydrochloric acid the somewhat difficultly soluble hydrochloride melting at 232–235° C. with decomposition is obtained. The methane sulfonate, which is prepared in ethylacetate-ether, melts at 95–98° C. It is easily soluble in water.

EXAMPLE 11

Following the method used in Example 6 there is obtained from 39.3 parts of 7-chloro-11-oxo-dibenzo-[b:f]-thia-[1]-aza - [4] - cycloheptadiene - [2:6], 7.5 parts sodamide and 23.8 parts of γ-dimethylamino-propyl chloride in dioxane the 7-chloro-10-(γ-dimethylaminopropyl)-11-oxo-dibenzo-[b:f]-thia-[1] - aza - [4] - cycloheptadiene-[2:6] of the formula

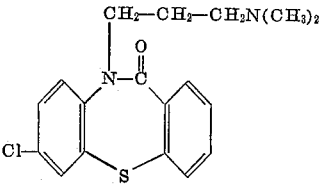

in the form of colorless crystals melting at 113–115° C. The hydrochloride prepared in ethyl acetate by the addition of the calculated quantity of alcoholic hydrochloric acid is a colorless crystalline powder melting at 182–184° C.

EXAMPLE 12

If instead of 8-chloro-11-oxo-dibenzo-[b:f]-thia-[1]-aza-[4]-cycloheptadiene-[2:6] as in Example 6, 6-chloro-11-oxo-dibenzo-[b:f]-thia-[1]-aza-[4] - cycloheptadiene-[2:6] is used, there is obtained the 6-chloro-10-(β-dimethylamino-ethyl)-11-oxo-dibenzo-[b:f]-thia-[1] - aza-[4]-cycloheptadiene-[2:6] of the formula

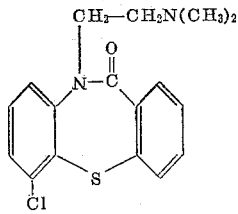

as colorless crystals melting at 98–100° C. (from isopropyl ether). The hydrochloride which is prepared in alcohol-ethyl acetate, is a colorless crystalline powder melting at 242° C. with decomposition.

EXAMPLE 13

If instead of 8-chloro-11-oxo-dibenzo-[b:f]-thia-[1]-aza-[4]-cycloheptadiene-[2:6] as in Example 7, 6-chloro-11-oxo-dibenzo-[b:f]-thia-[1]-aza-[4] - cycloheptadiene-[2:6] is used, there is obtained the 6-chloro-10-(γ-dimethylamino-propyl)-11-oxo-dibenzo - [b:f] - thia - [1]-aza-[4]-cycloheptadiene-[2:6] of the formula

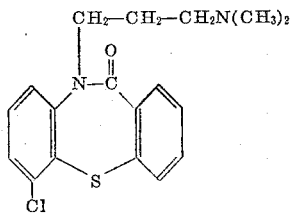

as colorless crystals melting at 108–110° C. (from isopropyl ether). The hydrochloride prepared in the manner described in Example 7 melts at 123–126° C.

EXAMPLE 14

If instead of the 39.3 parts of 8-chloro-11-oxo-dibenzo-[b:f]-thia-[1]-aza-[4]-cycloheptadiene-[2:6] as in Example 6, 36.3 parts of the 8-amino compound are used, there is obtained the 8-amino-10-(β-dimethylamino-ethyl)-11-oxo-dibenzo-[b:f]-thia - [1] - aza - [4] - cycloheptadiene-[2:6] of the formula

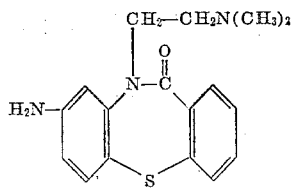

as faintly yellow crystals (from ethyl acetate) melting at 183–186° C. The hydrochloride, which is prepared in alcohol-ethyl acetate, yields crystals melting at 204° C. It is soluble in water.

EXAMPLE 15

29.6 parts of 7,8-dichloro-11-oxo-dibenzo-[b:f]-thia-[1]-aza-[4]-cycloheptadiene-[2:6], 5.0 parts of sodamide, 250 parts by volume of dioxane and 15.7 parts of γ-dimethylamino-propyl chloride are reacted together according to the method described in Example 3. There is obtained the 7,8 - dichloro-10-(γ-dimethylamino-propyl)-11-oxo-dibenzo-[b:f]-thia-[1]-aza-[4] - cycloheptadiene-[2:6] of the formula

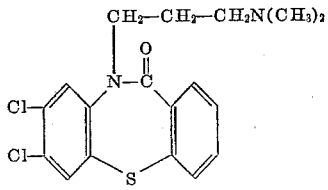

as colorless crystals melting at 93–95° C. (from ether). The hydrochloride which is prepared in alcohol, has a melting point of 234–236° C.

EXAMPLE 16

If instead of the 8-chloro-compound as in Example 6, 39.2 parts of 2-chloro-11-oxo-dibenzo-[b:f]-thia-[1]-aza-[4]-cycloheptadiene-[2:6] are used, there is obtained 2-chloro-10-(β-dimethylamino - ethyl) - 11 - oxo - dibenzo-[b:f]-thia-[1] - aza - [4] - cycloheptadiene - [2:6] of the formula

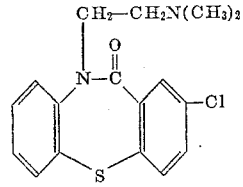

as a practically colorless oil boiling at 180–190° C. under 0.2 mm. pressure of mercury. The hydrochloride, prepared by the addition of alcoholic hydrochloric acid melts at 230° C.

EXAMPLE 17

19 parts of 8-chloro-(γ-diethylamino-propyl)-11-oxo-dibenzo - [b:f] - thia - [1] - aza - [4] - cycloheptadiene-[2:6] and 9 parts of ethyliodide are refluxed in 200 parts by volume of ethylacetate for 1 hour. After some time crystals begin to appear. When the precipitation is complete, the crystals are removed by filtration. The 8 - chloro - 10 - (γ - triethylammino - propyl) - 11 - oxo - dibenzo - [b:f] - thia [1] - aza - [4] - cycloheptadiene-[2:6]-iodide of the formula

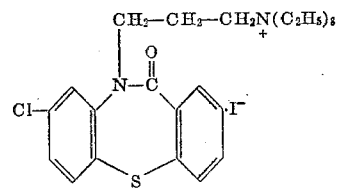

melts at 212–214°.

The starting materials for the foregoing examples are prepared as follows:

Example A 129.5 parts of 2-amino-diphenylsulfide-2'-carboxylic acid methyl ester are heated in a bath having a temperature of 245–250° C. for 40 minutes while distilling off the methyl alcohol formed and for a further 40 minutes under reduced pressure at the same temperature. In this manner the melt becomes solid. After being cooled, the crystalline mass is extracted at the boil with ethanol, disintegrated and filtered with suction in the cold. There is obtained in very good yield 11-oxo-dibenzo-[b:f]-thia-[1]-aza-[4]-cycloheptadiene-[2:6] of the formula

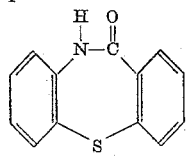

in the form of colorless crystals melting at 257–259° C.

The new compound can be recrystallized from glacial acetic acid or methyl ethyl ketone.

The reaction period can be considerably shortened by increasing the temperature to 280° C. Instead of the methyl ester there may be used another ester, for example the ethyl or propyl ester.

*Example B*

147 parts of 2-amino-4-chloro-diphenylsulfide-2'-carboxylic acid methyl ester are heated for 30 minutes under atmospheric pressure and for one hour under reduced pressure in an oil bath at 245–250° C. the melt becoming crystalline throughout. After being cooled, the mass is extracted at the boil with 500 parts by volume of ethyl acetate, disintegrated and filtered with suction in the cold. There is obtained in very good yield 8-chloro-11-oxo-dibenzo - [b:f] - thia - [1] - aza - [4] - cycloheptadiene-[2:6] of the formula

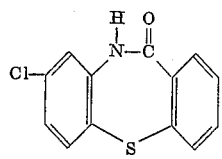

in the form of colorless crystals melting at 294–298° C., which can be recrystallized from dimethylformamide.

The 2 - amino - 4 - chloro - diphenyl sulfide - 2' - carboxylic acid methyl ester used as starting material in this example may be prepared, for example, by introducing 2,5-dichloro-nitrobenzene into a boiling solution of sodium thiosalicyclic acid methyl ester in methanol in the presence of a copper catalyst, and then reducing the resulting nitro-compound for example, catalytically. It melts at 136–137° C.

*Example C*

24.5 parts of 2-amino-diphenyl-sulfide-2'-carboxylic acid are heated for 30–60 minutes in an oil bath at 150–200° C. The resulting 11-oxo-dibenzo-[b:f]-thia-[1]-aza-[4]-cycloheptadiene-[2:6] melting at 257–259° C. is identical with the compound obtained in Example A.

*Example D*

If in Example B, 2-amino-5-chloro-diphenyl-sulfide-2'-carboxylic acid methyl ester is used in the place of the 2-amino-4-chloro-compound, there is obtained 7-chloro-11 - oxo - dibenzo - [b:f] - thia - [1] - aza - [4] - cycloheptadiene-[2:6] of the formula

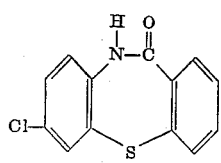

as colorless crystals melting at 316–320° C. (crystallized from dimethyl formamide).

The above starting material can be obtained for example, by reacting 2,4-dichloro-nitrobenzene with a solution of sodium thiosalicylic acid methyl ester in methanol at 40°–65° C. and then reducing catalytically in the presence of Raney nickel the resulting nitro-compound melting at 90–93° C. The 2-amino-5-chloro-diphenyl-sulfide-2'-carboxylic acid methyl ester melts at 144–146° C.

In an analogous manner there is obtained from 2-amino - 6 - chloro - diphenyl - sulfide - 2' - carboxylic acid methyl ester melting at 124–126° C. 6-chloro-11-oxo - dibenzo - [b:f] - thia - [1] - aza - [4] - cycloheptadiene-[2:6] of the formula

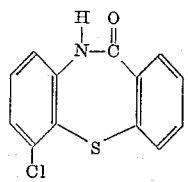

melting at 288–290° C. as a colorless crystalline powder (from dimethyl formamide).

*Example E*

29.4 parts of 2-amino-diphenyl-sulfide-4'-chloro-2'-carboxylic acid methyl ester are heated for one hour in an oil bath having a temperature of 230–260° C. in vacuo. After cooling, the reaction mass is boiled with methanol, disintegrated and filtered. There is obtained 2-chloro-11-oxo-dibenzo-[b:f]-thia-[1]-aza - [4] - cycloheptadiene-[2:6] of the formula

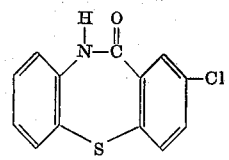

as almost colorless crystals which can be recrystallized from dimethyl formamide. It melts at 250–252° C.

The 2 - amino-diphenyl-sulfide-4'-chloro-2'-carboxylic acid methyl ester used as starting material can be prepared for example, by heating ortho-chloro-nitrobenzene with 5-chloro-thiosalicylic acid methyl ester in methanol in the presence of the calculated quantity of sodium methylate and reducing the resulting nitro compound catalytically with Raney nickel; it melts at 98–100° C.

*Example F*

32.8 parts of 2-amino-4,5-dichloro-diphenyl-sulfide-2'-carboxylic acid methyl ester are reacted according to the directions given in Example B. There is obtained 7,8-dichloro - 11 - oxo - [b:f]-thia-[1]-aza-[4]-cycloheptadiene-[2:6] of the formula

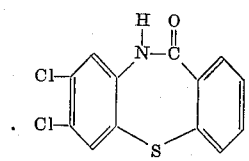

as colorless crystals melting at 301–304° C.

The above starting material is obtained by reacting 2,4,5-trichloro-nitrobenzene with the sodium salt of methylthiosalicylate in methanol at 40 to 65° C. in the presence of copper powder and catalytically reducing with Raney nickel the nitro compound thus obtained, which melts at 146–148° C.

EXAMPLE 18

28 grams of 8-methyl-11-oxo-dibenzo-[b:f]-thia-[1]-aza-[4]-cycloheptadiene-[2:6] and 6.4 grams of sodamide are heated in 300 cc. of absolute dioxane for 3 hours to boiling until the evolution of ammonia subsides. Then the whole is cooled to 60° C., treated dropwise with stirring within 30 minutes with a solution of 22.4 grams of β-dimethylaminoethyl chloride in 60 cc. of absolute benzene and the whole heated with stirring for a further 3 hours to boiling. Filtration is carried out from deposited common salt, followed by evaporation under vacuum and taking up of the residue in 200 cc. of ether. The ethereal solution is extracted with dilute hydrochloric acid and the aqueous solution treated with alkali. The separated base is dissolved in ether and the ether solution dried over magnesium sulfate and evaporated. The solid residue is recrystallised from isopropanol-petroleum ether and in this manner 33 grams are obtained of 8-methyl - 10 - (β - dimethylamino-ethyl)-11-oxo-dibenzo-[b:f]-thia-[1]-aza-[4]-cycloheptadiene-[2:6] of the formula

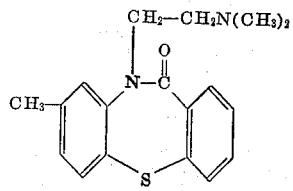

in the form of colorless crystals of M. P. 109–110° C.

A solution of the base in ethyl acetate gives by the addition of the calculated quantity of alcoholic hydrochloric acid, the colorless hydrochloride of M. P. 223–225° C. which is easily soluble in water.

In the above reaction, the dioxane can be replaced by another inert solvent such as benzene, toluene or xylene.

The 8 - methyl-11-oxo-dibenzo-[b:f]-thia-[1]-aza-[4]-cycloheptadiene-[2:6] used as starting material in this example can be prepared as follows:

In 300 cc. of absolute methanol are dissolved consecutively 17 grams of sodium and 112 grams of thiosalicyclic acid methyl ester. The solution produced is now heated to boiling and treated within 10 minutes with 130 grams of 3-nitro-4-chlorotoluene. The whole is then boiled for 2½ hours under reflux and filtered hot; on cooling, yellow crystals separate out. The product is filtered and in this manner 156 grams obtained of 2-nitro - 4 - methyl-diphenyl sulphide -2'-carboxylic acid methyl ester of M. P. 104–106° C.

150 grams of the nitro compound above obtained are dissolved in 1100 cc. of ethyl acetate and hydrogenated with hydrogen in the presence of 70 grams of nickel catalyst. After the catalyst has been filtered off, the solution is evaporated to 250 cc. and on cooling colorless crystals separate out. In this manner 125 grams of 2-amino - 4 - methyl-diphenyl sulphide-2'-carboxylic acid methyl ester are obtained of M. P. 83–85° C.

60 grams of the resulting amino compound are heated in a bath at 240–270° C. for 1 hour while allowing the methyl alcohol produced to distill off and then for a further 40 minutes under reduced pressure at the same temperature. As a result the melt becomes solid. After cooling, the crystal mass is extracted by boiling with 50 cc. of absolute alcohol, triturated and filtered with suction when cold. In this manner 47 grams are obtained of 8-methyl-11-oxo-dibenzo-[b:f]-thia-[1]-aza-[4]-cycloheptadiene-[2:6] in the form of colorless crystals of M. P. 228–291° C.

The new compound can be recrystallized from glacial acetic acid or from dimethyl formamide.

EXAMPLE 19

When in Example 18 the β-dimethylamino-ethyl chloride is replaced by 28.5 grams of β-diethylamino-ethyl chloride, there is obtained by a similar method of working a crude base which is recrystallized from isopropanol-petroleum ether to give the pure 8-methyl-10-(β-diethylamino-ethyl)-11-oxo-dibenzo-[b:f]-thia - [1] - aza - [4]-cycloheptadiene-[2:6] as colorless crystals of M. P. 72–73° C.

The hydrochloride, crystallized from a mixture of alcohol-ethyl-acetate, has the melting point 197–199° C. and is of good solubility in water.

EXAMPLE 20

By using, according to the directions of Example 18, instead of β-dimethylamino-ethyl chloride 28.5 grams of β-N-isopropyl-N-methylamino-ethyl chloride and recrystallizing the crude base obtained from petroleum ether, the 8-methyl-10-(β-N-isopropyl-N-methyl-amino - ethyl)-11-oxo-dibenzo-[b:f]-thia-[1]-aza-[4] - cycloheptadiene-[2:6] of the formula

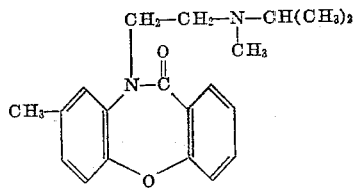

is obtained as colorless crystals of M. P. 92–93° C.

The hydrochloride, obtained in ethyl acetate with the aid of alcoholic hydrochloric acid, is a colorless crystal powder of M. P. 209–210° C. which is easily soluble in water.

EXAMPLE 21

The 8-methyl-10-(γ-dimethylamino - propyl) - 11 - oxo-dibenzo-[b:f]-thia-[1]-aza-[4]-cycloheptadiene-[2:6] of the formula

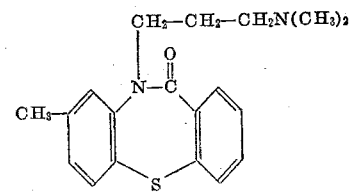

is obtained in the form of colorless crystals of M. P. 83–85° C., using the directions of Example 18 but with the replacement of β-dimethylamino-ethyl chloride by 24.5 grams of γ-dimethylamino-propyl chloride.

The hydrochloride, prepared in an alcohol-ethyl acetate mixture has a melting point of 170–172° C.; it is easily soluble in water.

EXAMPLE 22

10 grams of 7-methyl-11-oxo-dibenzo-[b:f]-thia-[1]-aza-[4]-cycloheptadiene-[2:6] are boiled with 2.3 grams of sodamide in 150 cc. of absolute dioxane for 3 hours under reflux with stirring until the evolution of ammonia subsides. The whole is now cooled to 70° C. and treated dropwise with energetic stirring, within 30 minutes, with a solution of 8 grams of β-dimethylamino-ethyl chloride in 40 cc. of absolute benzene. After boiling for 3 hours under reflux, the excess of sodamide is destroyed with a little methyl alcohol, deposited common salt is filtered off and the filtrate is evaporated under vacuum to dryness. The residue is taken up in 150 cc. of ethyl acetate, extracted with dilute sulfuric acid and the aqueous acid solution is treated with alkali. The base produced is taken up in ethyl acetate and after drying over magnesium sulfate the solvent is distilled off. The residual oil becomes solid on standing and after recrystallization from ether-petroleum ether the pure 7-methyl-10-(β-dimethylamino-ethyl)-11-oxo-dibenzo-[b:f]-thia - [1] - aza-[4]-cycloheptadiene-[2:6] of the formula

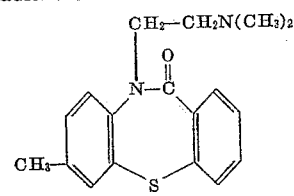

is obtained in colorless crystals of M. P. 75–76° C.

From the base the hydrochloride is obtained by neutralisation of the alcoholic solution with the calculated quantity of hydrochloric acid in ethyl acetate. It melts at 236–237° C. and is soluble in water.

The 7-methyl-11-oxo-dibenzo-[b:f]-thia-[1]-aza - [4]-cycloheptadiene-[2:6] used as starting material in this example is prepared by a process analogous to that described in Example 18 for the 8-methyl-11-oxo-dibenzo-[b:f]-thia-[1]-aza-[4]-cycloheptadiene-[2:6].

From 3-chloro-4-nitro-toluene and thiosalicyclic acid methyl ester there is obtained the 2-nitro-5-methyl-diphenyl-sulphide-2'-carboxylic acid methyl ester of M. P. 86–88° C. By catalytic hydrogenation there is obtained therefrom the 2-amino-5-methyl-diphenyl-sulfide-2'-carboxylic acid methyl ester of M. P. 82–84° C., which on heating to 240–270° C. gives 7-methyl-11-oxo-dibenzo-[b:f]-thia-[1]-aza-[4]-cycloheptadiene-[2:6] of M. P. 272–274° C.

EXAMPLE 23

By the use of 10 grams of 6-methyl-11-oxo-dibenzo-[b:f]-thia-[1]-aza-[4]-cycloheptadiene-[2:6] instead of the 7-methyl compound of Example 22, there is obtained 6-methyl-10-(β-dimethylamino-ethyl)-11 - oxo - dibenzo-[b:f]-thia-[1]-aza-[4]-cycloheptadiene-[2:6] of the formula

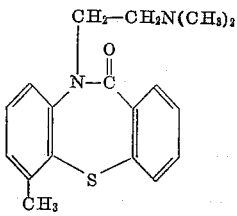

in colorless crystals of M. P. 105–107° C.

The hydrochloride, prepared in an ethanol-ethyl acetate mixture has a melting point of 240–241° C. and is soluble in water.

The 6-methyl-11-oxo-dibenzo-[b:f]-thia-[1]-aza - [4]-cycloheptadiene-[2:6] used as starting material in this example is prepared by an analogous process to that described in Example 18 for the 8-methyl compound.

Reaction of 2-bromo-3-nitro-toluene with thiosalicyclic acid methyl ester in the presence of sodium methylate gives the 2-nitro-6-methyl-diphenyl-sulphide-2'-carboxylic acid methyl ester of M. P. 100–102° C., from which, by catalytic hydrogenation, the 2-amino-6-methyl-diphenyl-sulphide-2'-carboxylic acid methyl ester of M. P. 86–87° C. is obtained. Fusion of this amino compound at 240–270° C. yields the 6-methyl-11-oxo-dibenzo-[b:f]-thia-[1]-aza-[4]-cycloheptadiene-[2:6] of M. P. 257–258° C.

EXAMPLE 24

By the use of 7:8-dimethyl-11-oxo-dibenzo-[b:f]-thia-[1]-aza-[4]-cycloheptadiene-[2:6] instead of 7-methyl-11 - oxo - dibenzo - [b:f] - thia - [1] - aza - [4] - cycloheptadiene-[2:6] as in Example 22, there is obtained the 7:8 - dimethyl - 10 - (β-dimethylamino - ethyl) - 11-oxo - dibenzo - [b:f] - thia - [1] - aza - [4] - cycloheptadiene-[2:6] of the formula

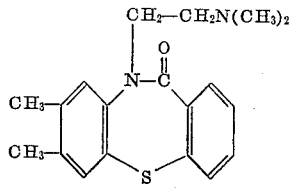

as colorless crystals of M. P. 114–115° C.

The hydrochloride, prepared in alcohol-ethyl acetate, is a colorless powder of M. P. 255–257° C. with decomposition.

The above-mentioned starting material can, for example, be prepared as follows:

By reaction of 1:2-dimethyl-4-nitro-5-chloro-benzene with a solution of sodium thiosalicylic acid methyl ester in methanol there is obtained the 2-nitro-4:5-dimethyl-diphenyl-sulfide-2'-carboxylic acid methyl ester of M. P. 93–95° C. Subsequent catalytic reduction yields the corresponding amino compound of M. P. 130–132° C. and after fusion at 240–270° C. there is obtained the 7:8-dimethyl - 11 - oxo - dibenzo - [b:f] - thia - [1] - aza - [4]-cycloheptadiene-[2:6] of M. P. 303–305° C.

EXAMPLE 25

15 grams of 8-methoxy-11-oxo-dibenzo-[b:f]-thia-[1]-aza-[4]-cycloheptadiene-[2:6] and 3.2 grams of sodamide are heated under reflux with stirring in 150 cc. of absolute dioxane until the evolution of ammonia subsides. The whole is then cooled to 60° C., treated dropwise with energetic stirring within 30 minutes with a solution of 8.5 grams of β-dimethyl-amino-ethyl chloride in 40 c. of absolute benzene and the whole heated with stirring for a further 2 hours to boiling. After the reaction mixture has stood for a few hours at room temperature, unused sodamide is destroyed with a little methanol, deposited common salt filtered off and the filtrate evaporated under vacuum and the residue taken up in 200 c. of ether. The ethereal solution is extracted with dilute hydrochloric acid and the aqueous acid solution treated with alkali whereby the base separates as an oil. This is taken up in ether, the solution dried over magnesium sulfate and the ether evaporated under vacuum. In this manner 15 grams are obtained of 8-methoxy-10-(β - dimethylamino - ethyl) - 11 - oxo - dibenzo - [b:f]-thia-[1]-aza-[4]-cycloheptadiene-[2:6] of the formula

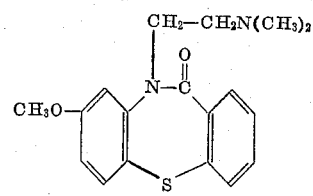

as a pale brown viscous oil.

A solution of the base in ethyl acetate gives on addition of the calculated quantity of alcoholic hydrochloric acid the colorless hydrochloride of M. P. 189–192° C. which is of good solubility in water.

The 8 - methoxy - 11 - oxo - dibenzo - [b:f] - thia-[1]-aza-[4]-cycloheptadiene-[2:6] used as starting material in this example is prepared as follows:

By the reaction of 1-methoxy-3-nitro-4-chlorobenzene with thiosalicylic acid methyl ester in methanol in the presence of sodium methylate there is obtained the 2-nitro-4-methoxy-diphenyl-sulfide-2'-carboxylic acid methyl ester of M. P. 105–106° C. From this by catalytic hydrogenation the 2-amino-4-methoxy-diphenyl-sulfide-2'-carboxylic acid methyl ester of M. P. 134–135° C. is obtained which when heated to 240–270° C. yields 8-methoxy - 11 - oxo - dibenzo - [b:f] - thia - [1] - aza - [4]-cycloheptadiene-[2:6] of M. P. 218–219° C.

EXAMPLE 26

By using instead of the β-dimethylamino-ethyl chloride of Example 25, 10.3 grams of β-diethylamino-ethyl chloride, there is obtained the 8-methoxy-10-(β-diethylamino - ethyl) - 11 - oxo - dibenzo - [b:f] - thia - [1]-aza-[4]-cycloheptadiene-[2:6] of the formula

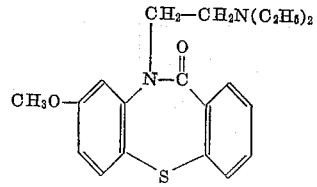

as a pale brown viscous oil.

The hydrochloride, produced in ethyl acetate using alcoholic hydrochloric acid, is a colorless crystal powder of M. P. 190–192° C.; it is of good solubility in water.

EXAMPLE 27

The 8 - methoxy - 10 - (γ - dimethylamino - propyl)-11 - oxo - dibenzo - [b:f] - thia - [1] - aza - [4] - cycloheptadiene-[2:6] of the formula

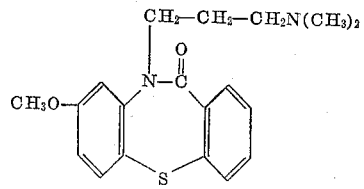

is obtained using the directions of Example 25 but with 9 grams of γ-dimethylamino-propyl chloride instead of the β-dimethyl-ethyl chloride. By recrystallisation of the crude base from isopropanol-petroleum ether, colorless crystals are obtained of M. P. 104–106° C.

The hydrochloride, prepared in an alcohol-ethyl acetate mixture, has a melting point of 141–143° C., contains 1

What is claimed is:

1. A member of the group consisting of cycloheptadienes of the general formula

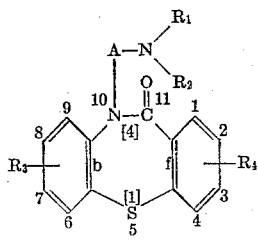

wherein A stands for a lower alkylene radical, $R_1$ and $R_2$ represent members selected from the group consisting of lower alkyl, cycloalkyl having 5 to 6 carbon atoms and, when taken together, morpholino and lower alkylene radicals forming with the amino nitrogen a ring of 5 to 6 members, and $R_3$ and $R_4$ represent, interchangeably, a member of the group consisting of hydrogen, halogen, amino, lower alkyl, and lower alkoxy substitutents, and therapeutically useful acid addition salts and lower alkyl quaternary ammonium salts thereof.

2. 10 - ($\beta$ - dimethylamino - ethyl) - 11 - oxo - dibenzo-[b:f]-thia-[1]-aza-[4]-cycloheptadiene-[2:6] of the formula:

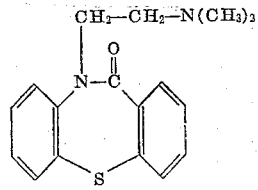

3. 2 - chloro - 10 - ($\beta$ - dimethylamino - ethyl) - 11 - oxo - dibenzo - [b:f] - thia-[1]-aza-[4]-cycloheptadiene-[2:6] of the formula:

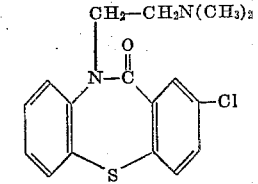

4. 7 - chloro - 10 - ($\beta$ - dimethylamino - ethyl) - 11 - oxo - dibenzo - [b:f] - thia - [1] - aza - [4] - cycloheptadiene-[2:6] of the formula:

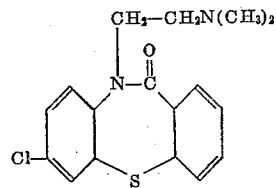

5. 7 - chloro - 10 - ($\gamma$ - dimethylamino - propyl) - 11 - oxo - dibenzo - [b:f] - thia - [1] - aza - [4] - cycloheptadiene-[2:6] of the formula:

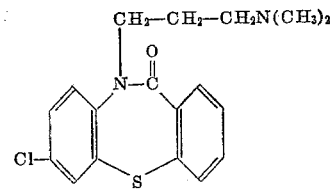

6. 8 - methyl - 10 - ($\beta$ - dimethyl - amino - ethyl) - 11 - oxo - dibenzo - [b:f] - thia - [1] - aza - [4] - cycloheptadiene-[2:6] of the formula:

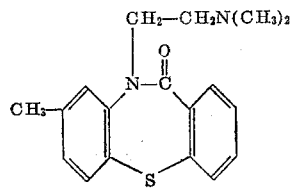

No references cited.

UNITED STATES PATENT OFFICE
Certificate of Correction

Patent No. 2,852,510                                  September 16, 1958

Karl Hoffmann et al.

It is hereby certified that error appears in the printed specification of the above numbered patent requiring correction and that the said Letters Patent should read as corrected below.

Column 1, line 36, for "oxyaalkylene" read *oxaalkylene*; line 48, for "hereto" read *hetero*; column 5, lines 53 to 61, the formula should appear as shown below instead of as in the patent—

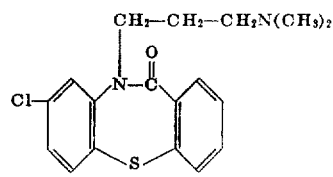

column 6, line 36, for "azo" read *aza*; column 8, line 41, for "triethylammino" read *triethylammonio*.

Signed and sealed this 6th day of January 1959.

[SEAL]

Attest:
KARL H. AXLINE,
*Attesting Officer.*

ROBERT C. WATSON,
*Commissioner of Patents.*